(12) United States Patent
Chang et al.

(10) Patent No.: US 8,304,705 B2
(45) Date of Patent: Nov. 6, 2012

(54) SYSTEM AND METHOD FOR ADJUSTING LIGHT SOURCES IN MEASUREMENT OF A SURFACE IMAGE

(75) Inventors: Chih-Kuang Chang, Taipei Hsien (TW); Xian-Yi Chen, Shenzhen (CN); Zhong-Kui Yuan, Shenzhen (CN); Li Jiang, Shenzhen (CN); Yi-Rong Hong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 663 days.

(21) Appl. No.: 12/547,632

(22) Filed: Aug. 26, 2009

(65) Prior Publication Data
US 2010/0110503 A1 May 6, 2010

(30) Foreign Application Priority Data
Oct. 31, 2008 (CN) .......................... 2008 1 0305322

(51) Int. Cl.
*G01J 1/32* (2006.01)
*G06M 7/00* (2006.01)
(52) U.S. Cl. ....................................... 250/205; 250/221

(58) Field of Classification Search .................. 362/800, 362/4, 5; 250/208.1, 225, 221, 205, 208.2; 315/149, 150, 154, 155, 158, 159, 307, 291; 702/33, 40
See application file for complete search history.

(56) References Cited

U.S. PATENT DOCUMENTS

| | | | |
|---|---|---|---|
| 6,207,946 B1 * | 3/2001 | Jusoh et al. | 250/208.1 |
| 2008/0205713 A1 * | 8/2008 | Nagashita | 382/124 |
| 2009/0206235 A1 * | 8/2009 | Guan et al. | 250/205 |
| 2009/0317018 A1 * | 12/2009 | Chang et al. | 382/274 |

FOREIGN PATENT DOCUMENTS
TW 564308 12/2003
\* cited by examiner

*Primary Examiner* — Pascal M Bui Pho
(74) *Attorney, Agent, or Firm* — Altis Law Group, Inc.

(57) ABSTRACT

A computer-implemented method for adjusting light intensity of light sources of an image measuring machine in measurement of a surface image of an object includes obtaining the surface image of the object, setting one light source to be adjusted and adjusting a light intensity of the light source according to an adjusting mode. The method further includes computing an optimum light intensity level, adjusting a light intensity to the optimum light intensity level to obtain an optimum surface image of the object, and storing the optimum surface image and the optimum light intensity level into a storage system.

17 Claims, 6 Drawing Sheets

SYSTEM AND METHOD FOR ADJUSTING LIGHT SOURCES IN MEASUREMENT OF A SURFACE IMAGE

BACKGROUND

1. Technical Field

Embodiments of the present disclosure relate to systems and methods for adjusting light sources, and more particularly to a system and method for adjusting light sources in measurement of a surface image.

2. Description of Related Art

Product quality has long been one of the most important factors in maintaining a typical manufacturing enterprise's competitiveness. Ways of improving the quality of products is an important ongoing pursuit of such enterprises. It is essential to verify the correctness of an object before the object gets mass produced. One such method to verify correctness of an object is to use an image measuring machine installed with a charge coupled device (CCD) to obtain an image of the object by scanning the object. Generally, the image may be defined as a profile image or a surface image as a result of different shooting angles. Between the two types of images, the surface image can be used for detecting a surface boundary of the object. However, light source adjustment is an essential problem during the surface image measurement process. In normal cases, when the user adjusts light sources to measure the surface image of the object, errors are often occurred, and labor intensity of the user is high.

What is needed, therefore, is a system and method for adjusting light sources of the image measuring machine in measurement of the surface image, so as to overcome the above-described shortcomings.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
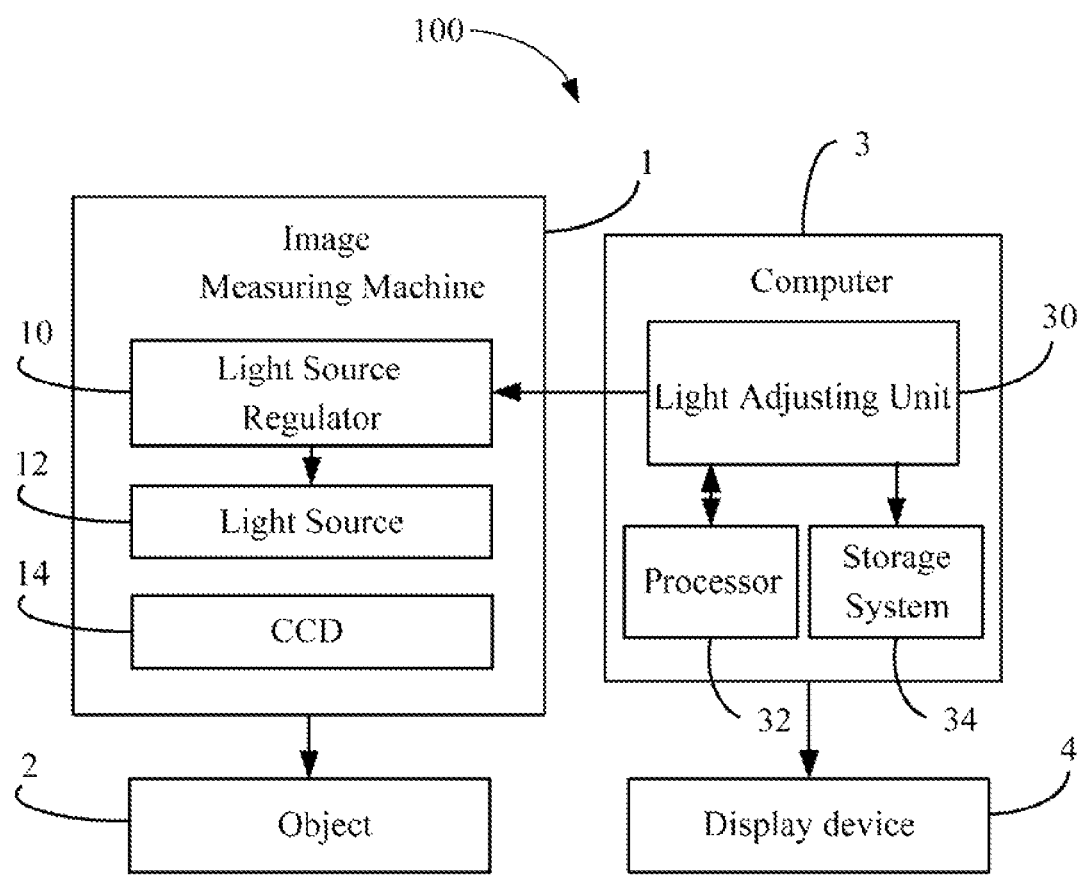
FIG. 1 is a block diagram of one embodiment of a system for adjusting light sources in measurement of a surface image.

FIG. 1 is a block diagram of one embodiment of a light source adjusting system 100. The light source adjusting system 100 is operable to control light sources to measure a surface image. In one embodiment, the light source adjusting system 100 includes an image measuring machine 1, an object 2 positioned on a platform of the image measuring machine 1, and a computer 3 electrically connected to the image measuring machine 1, and a display device 4. The image measuring machine 1 typically includes a light source regulator 10, at least one light source 12 (one light source is shown in FIG. 1) and a charge coupled device (CCD) 14. The light source regulator 10 is operable to adjust lighting of the at least one light source 12 on the object 2 when the CCD 14 captures the surface image of the object 2. The CCD 14 is operable to capture a surface image of the object 2 positioned on the platform of the image measuring machine 1 lit by the at least one light source 12.

In one embodiment, the computer 3 may include a light adjusting unit 30, at least one processor 32, and a storage system 34. The light adjusting unit 30 is operable to control the light source regulator 10 to adjust intensity of the at least one light source 12, in order to obtain an optimum light intensity level, to measure the surface image of the object 2. The at least one processor 32 is operable to execute the light adjusting unit 30 that may comprise one or more computerized operations that are stored in the storage system 34. The storage system 34 may be a hard disk drive, a compact disc, a digital video disc, or a tape drive.

The at least one light source 12 may include an axis light and/or a ring light, to emit light at different light intensities. In one embodiment, the different light intensity levels may range from level 0 to level 100. In another embodiment, the light intensity can be expressed by definitions and gray values of the surface image. Generally, when the definition is high, the surface image is clear and closely outlined, which is preferable. A maximum distribution range of the gray values is [0, 255] (i.e., in the range from about 0 to about 255). An example with the present disclosure, if one light source 12 is adjusted to the level 0, the surface image may be black, the light intensity is low, and the gray value of the surface image is about "0"; otherwise, if the light source 12 is adjusted to the level 100, the surface image may be white, the light intensity is high, and the gray value of the surface image is about "255."

Figure 2:
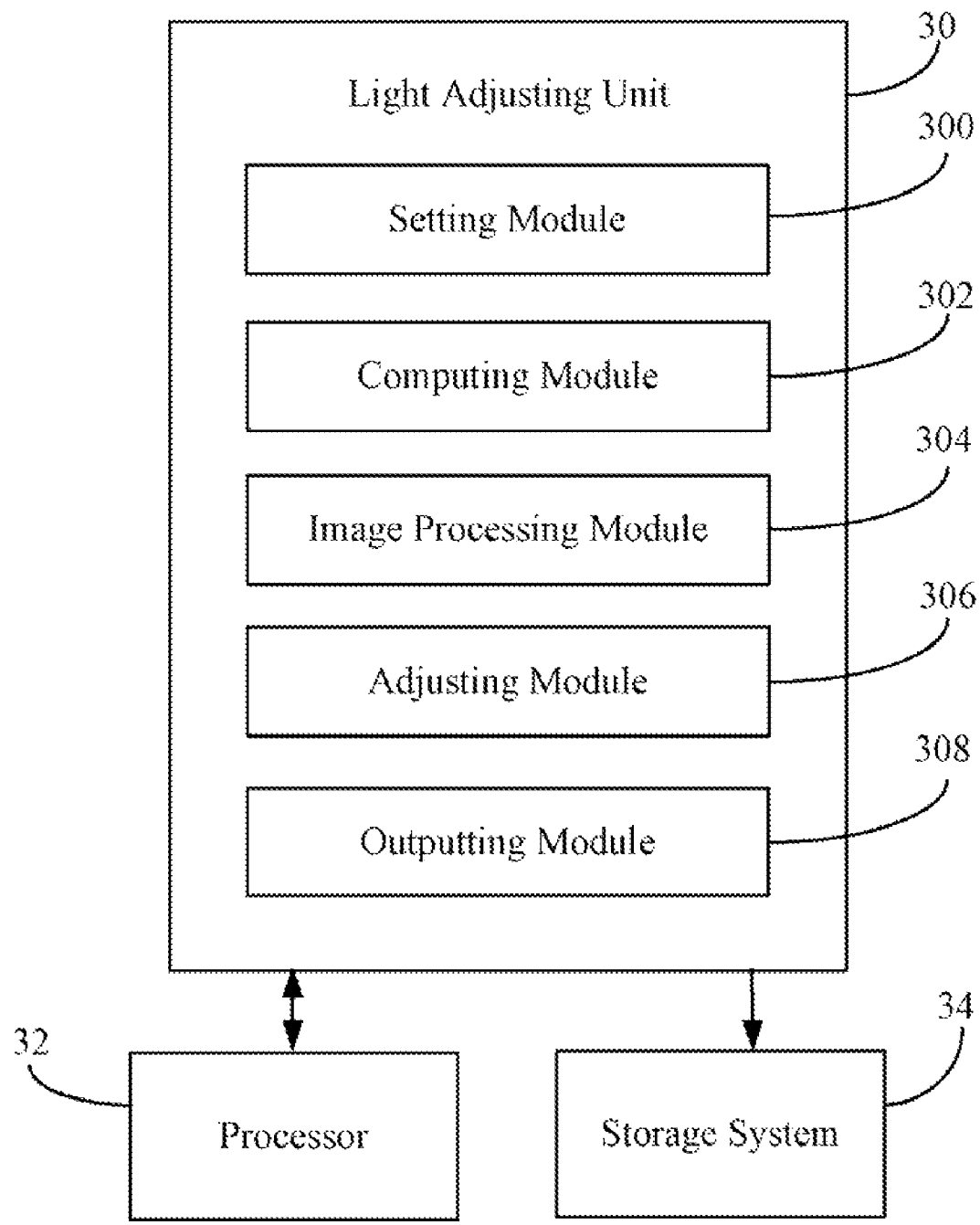
FIG. 2 is a block diagram of one embodiment of a light adjusting unit of FIG. 1.

FIG. 2 is a block diagram of one embodiment of the light adjusting unit 30 of FIG. 1. The light adjusting unit 30 may include a plurality of instructions executable by the processor 32 of the computer 3. In one embodiment, the light adjusting unit 30 may include a setting module 300, a computing module 302, an image processing module 304, an adjusting module 306, and an outputting module 308.

After the surface image of the object 2 is obtained, the setting module 300 is operable to set one light source 12 to be adjusted, for example, set the light source 12 as the axis light or the ring light. The setting module 300 is further operable to select an adjusting mode that adjusts light intensity of the light source 12. The adjusting mode includes a definition mode and a gray mode. The definition mode is used for adjusting the definition of the surface image, and the gray mode is used for adjusting the gray value of the surface image.

The computing module 302 is operable to compute an optimum light intensity level according to the adjusting mode. In one embodiment, if the adjusting mode is set as the definition mode, the computing module 302 compares average definitions between two consecutive surface images of the object 2 to increase or decrease the current light intensity level to obtain the optimum light intensity level (as detailed in FIG. 4). In another embodiment, if the adjusting mode is set to the gray mode, the computing module 302 sets intensity variables for adjusting the light intensity of the light source 12, and computes the optimum light intensity level utilizing an iterative method according to the intensity variables. In the embodiment, the intensity variables may include an upper approach level and a lower approach level, as will be explained in detail below. Details of the iterative method are described in FIG. 6 below.

The image processing module 304 is operable to perform a mean filter processing and a binary image processing on the surface image of the object 2. In the embodiment, the mean filter processing and binary image processing are used to increase contrast of the surface image, reduce image noises of the surface image, and reduce uneven gray-level distribution.

The adjusting module 306 is operable to obtain an optimum surface image of the object 2 by adjusting the light intensity level of the light source 12 to the optimum light intensity level.

The outputting module 308 is operable to display the optimum surface image on the display device 4, or store the optimum surface image and the optimum light intensity level into the storage system 34.

Figure 3:
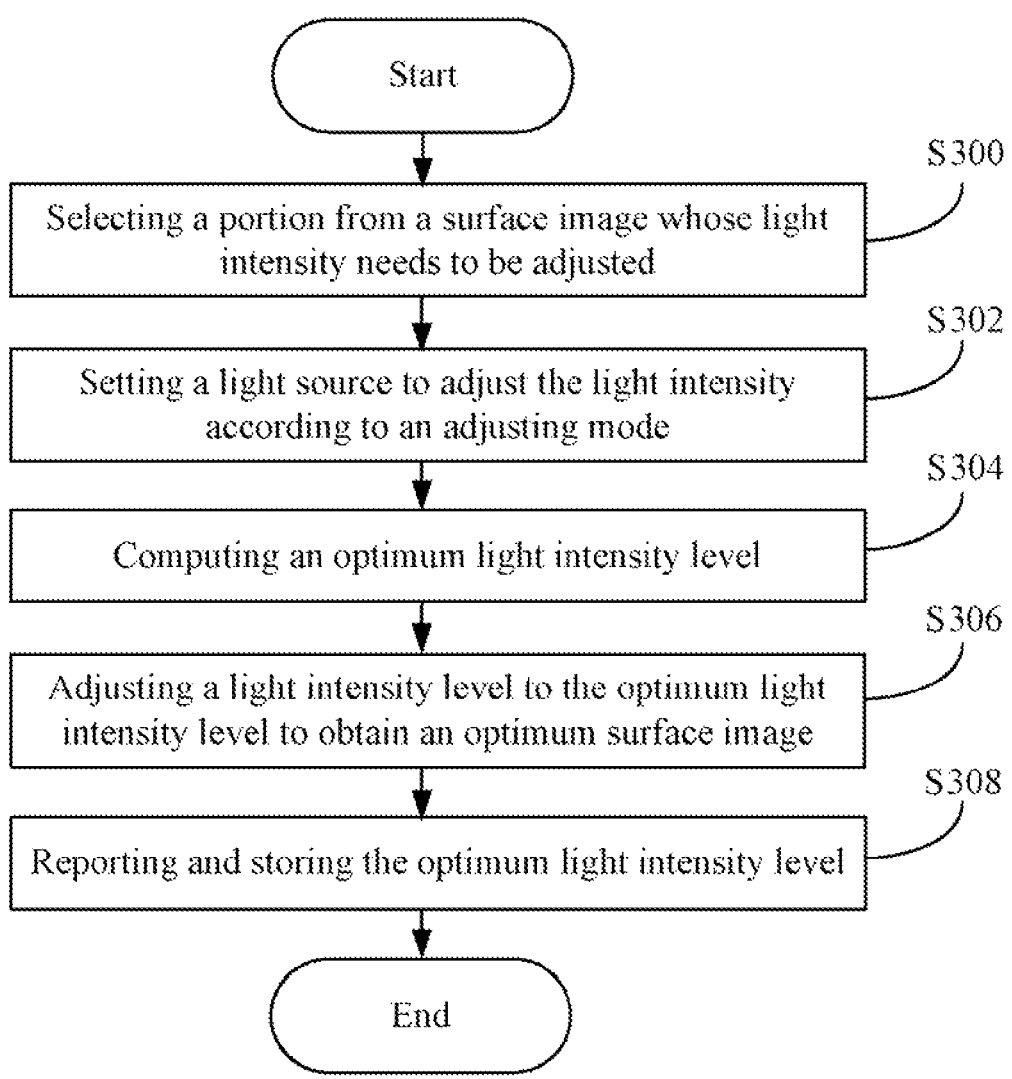
FIG. 3 is a flowchart of one embodiment of a method for adjusting light sources in measurement of a surface image.

FIG. 3 is a flowchart of one embodiment of a method for adjusting the light source 12 in measurement of a surface image by using the light source adjusting system 100 as described in FIG. 1. Depending on the embodiment, additional blocks may be added, while others removed, and the ordering of the blocks may also be changed.

In block S300, the CCD 14 obtains a surface image of the object 2 that is positioned on a platform of the image measuring machine 1, and selects a portion from the surface image.

In block S302, the setting module 300 selects an adjusting mode to adjust the light intensity level of the light source 12. In the embodiment, the light source 12 may be an axis light or a ring light. The adjusting mode includes a definition mode and a gray mode.

In block S304, the computing module 302 computes an optimum light intensity level according to the adjusting mode. In the embodiment, details of the computing method are described in FIG. 4 and FIG. 5 below.

In block S306, the adjusting module 306 controls the light source regulator 10 to adjust the light intensity level to the optimum light intensity level, in order to obtain an optimum surface image.

In block S308, the outputting module 308 displays the optimum surface image on the display device 4, and stores the optimum surface image and the optimum light intensity level into the storage system 34 of the computer 3.

In the embodiment, the present embodiment gives two examples that the light source 12 is adjusted by the definition mode and the gray mode, as will be explained in greater detail in FIG. 4 and FIG. 5.

Figure 4:
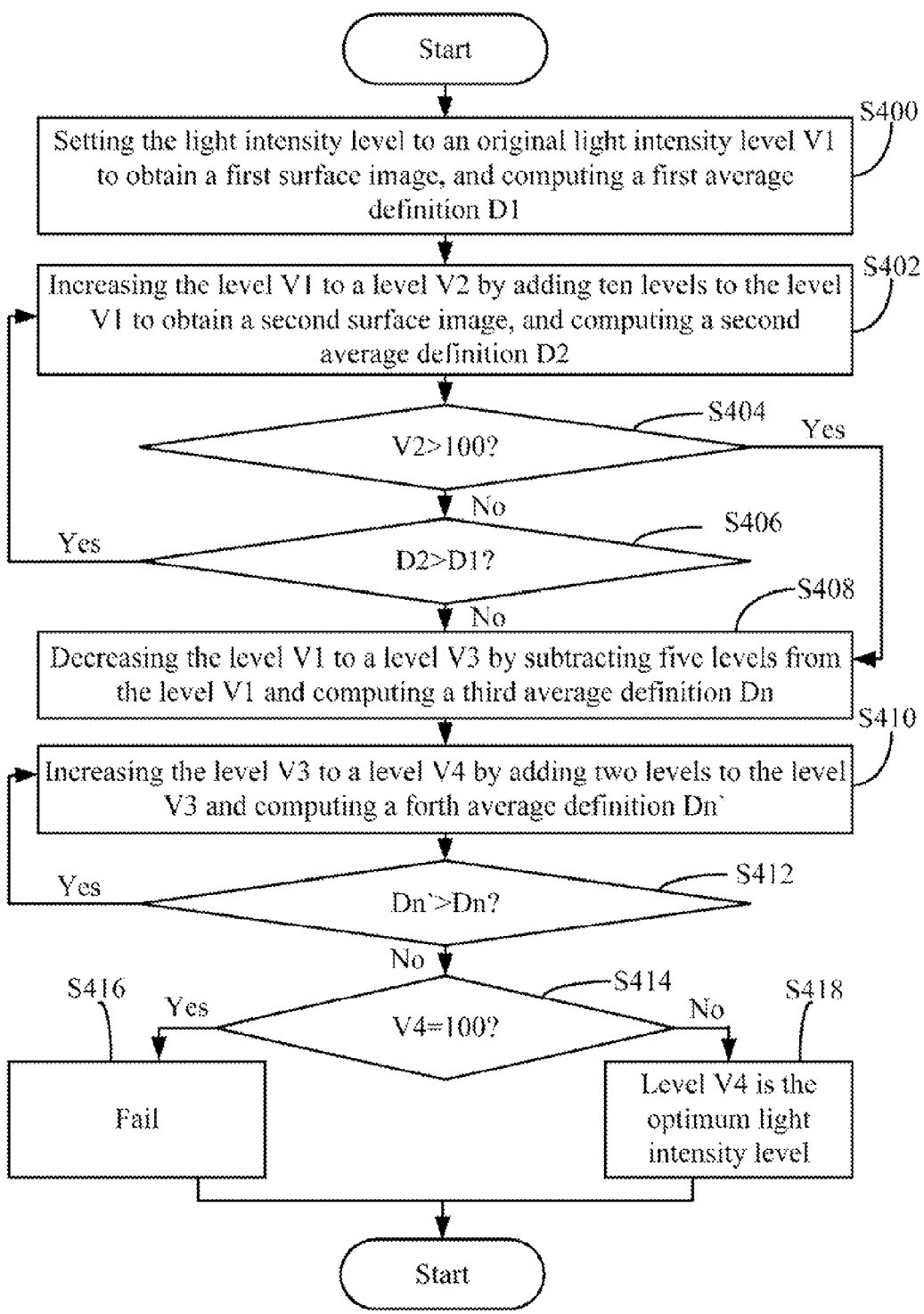
FIG. 4 is one block of FIG. 3 in detail, namely adjusting a ring light through adjusting a definition of the surface image.

FIG. 4 shows a method of adjusting the ring light according to the definition mode.

In block S400, the computing module 302 sets the light intensity level of the ring light to an original light intensity level (denoted as $V_1$") to obtain a first surface image, and computes a first average definition (denoted as "$D_1$") of the first surface image.

In block S402, the adjusting module 306 increases the original light intensity level $V_1$ to a second intensity level (denoted as "$V_2$") by adding ten levels to the level V1, namely V2=V1+10, the computing module 302 obtains a second surface image and computes a second average definition (denoted as $D_2$") of the second surface image.

In block S404, the computing module 302 determines whether the level $V_2$ is greater than 100. If the level $V_2$ is greater than 100, the procedure directly enters block S408 as described below. If the level $V_2$ is not greater than 100, in block S406, the computing module 302 determines whether the second average definition $D_2$ is greater than the first average definition $D_1$.

If $D_2 > D_1$, the procedure returns to block S402 as described above. Otherwise, if $D_2 <= D_1$, in block S408, the adjusting module 306 decreases the level $V_1$ to a third intensity level (denoted as "$V_3$") by subtracting five levels to the level V1, namely V3=V2−5, the computing module 302 obtains a third surface and computes a third average definition (denoted as "Dn") of the third surface image.

In block S410, the adjusting module 306 increases the level $V_3$ to a forth level (denoted as "$V_4$") by adding two levels to the level V3, namely V4=V3+2, the computing module 302 obtains a forth surface image and compute a forth average definition (denoted as "Dn'") of the forth surface image.

In block S412, the computing module 302 determines whether the forth average definition Dn' is greater than the third average definition Dn.

If Dn'>Dn, the procedure returns to block S410. If Dn'<=Dn, in block S414, the computing module 302 determines whether the level $V_4$ is equal to 100.

If V4=100, the ring light is failed adjusting. That is, the ring light cannot be adjusted to the optimum light intensity level, the light intensity level of the ring light is level 100. After the ring light is adjusted, the setting module 300 can set the light source 12 as the axis light to be adjusted. Otherwise, if the level $V_4$ is not equal to 100, the computing module 302 determines that the level $V_4$ is the optimum light intensity level.

Figure 5:
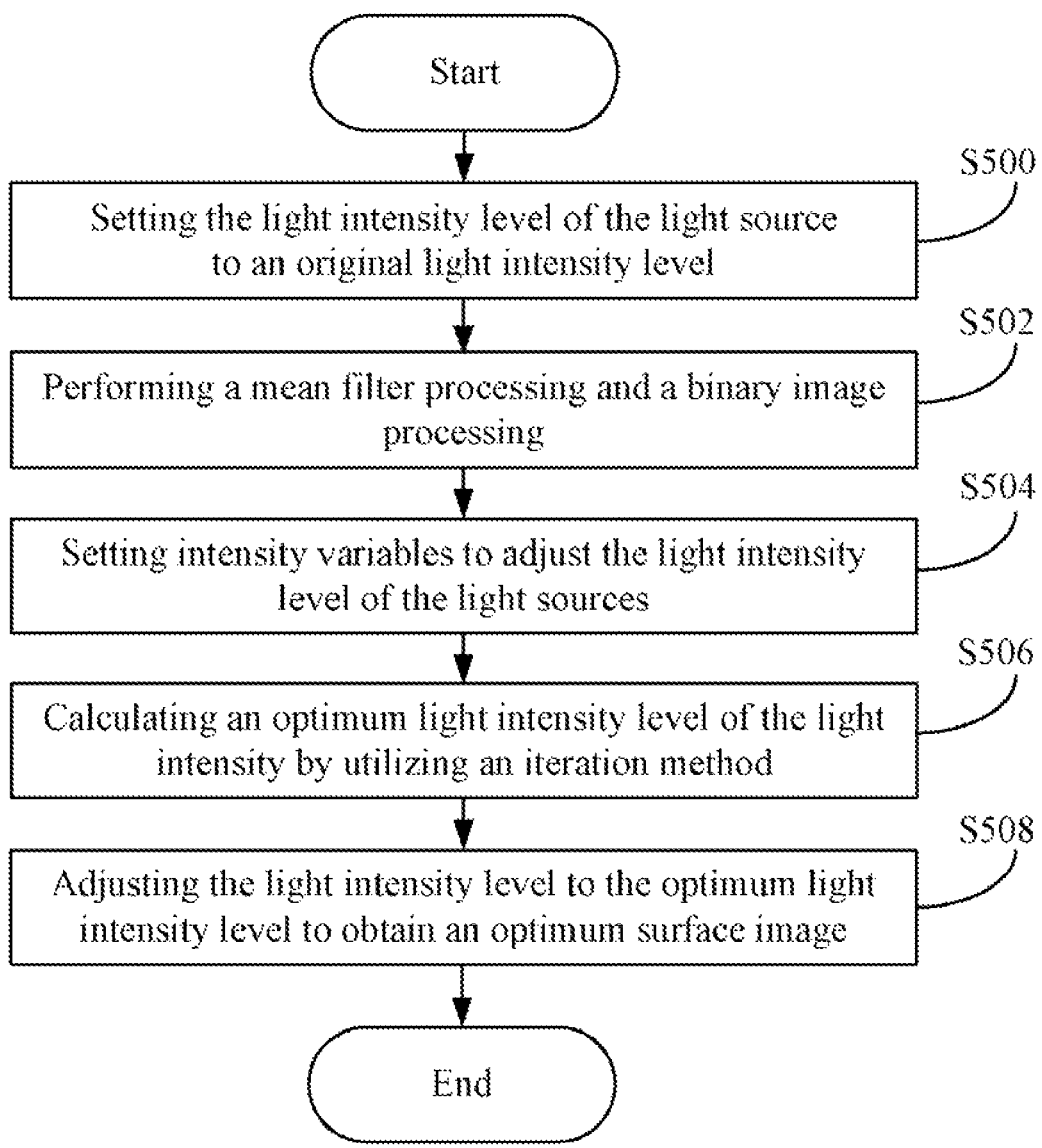
FIG. 5 is one block of FIG. 3 in detail, namely adjusting a ring light through adjusting a gray value of the surface image.

FIG. 5 shows a method of adjusting the ring light according to the gray mode.

In block S500, the setting module 300 sets the light intensity level of the ring light to an original light intensity level. In the embodiment, the original light intensity level may range from the level 0 to level 100, but cannot be the level 0 or the level 100. The present embodiment gives an example that the original light intensity level equals 10.

In block S502, the image processing module 304 obtains the selected portion image, and performs the mean filter processing and binary image processing on the portion image, in order to increase a contrast of the portion image, reduce image noises of the portion image, and reduce uneven gray-level distribution of the portion image.

In block S504, the computing module 302 sets a plurality of intensity variables for adjusting the light intensity of the ring light. The intensity variables may include an upper approach level and a lower approach level.

In block S506, the computing module 302 computes the optimum light intensity level of the light intensity by utilizing an iterative method according to the intensity variables. The iterative method will be described in the following FIG. 6.

In block S508, the adjusting module 306 controls the light source regulator 10 to adjust the light intensity level to the optimum light intensity level, and the CCD 14 obtains an optimum surface image from the portion image.

Figure 6:
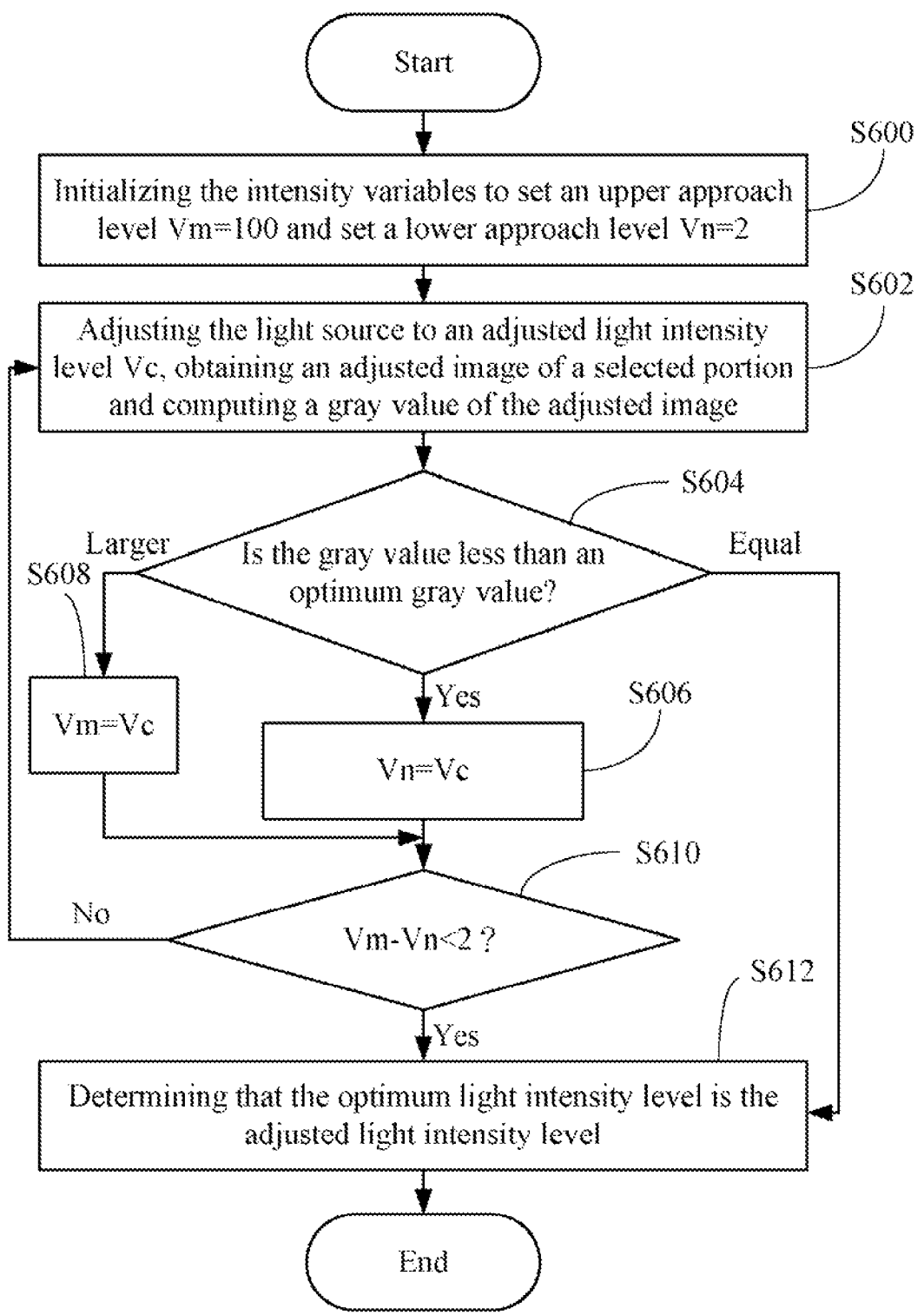
FIG. 6 is one block of FIG. 5 in detail, namely computing an optimum light intensity level of the light intensity by utilizing an iterative method.

FIG. 6 is a detailed flowchart of block S506 of FIG. 5, namely computing the optimum light intensity level (symbolically depicted as "Vp") of the light intensity by utilizing an iterative method.

In block S600, the computing module 302 initializes the intensity variables to set the upper approach level (symbolically depicted as "Vm") to the level 100, and to set the lower approach level (symbolically depicted as "Vn") to the level 2.

In block S602, the adjusting module 306 controls the light resource regulator 10 to adjust the light intensity of the light source 12 to an adjusted light intensity level, the image processing module 304 obtains an adjusted image of the selected portion image based on the adjusted light intensity level, and the computing module 302 computes a gray value of the adjusted image. In the embodiment, the adjusted light intensity level (symbolically depicted as "Vc") is equal to one half of a sum value of the upper approach level Vm, and the lower approach level Vn, namely the adjusted light intensity level Vc=(Vm+Vn)/2.

In block S604, the computing module 302 determines whether the gray value of the adjusted image is less than an optimum gray value (symbolically depicted as "Gp") preset by the user. In the embodiment, the optimum gray value Gp is a middle value in the range from 0-255 gray levels, and is a gray value of the optimum surface image. The present embodiment gives an example that the optimum gray value Gp is equal to 125.

If the gray value equals the optimum gray value Gp, the flow directly enters block S612. If the gray value of the adjusted image is less than the optimum gray value Gp, in block S606, the computing module 302 sets the adjusted light intensity level Vc as the lower approach level Vn, and the flow may enter into block S610.

Otherwise, if the gray value of the adjusted image is greater than the optimum gray value Gp, in block S608, the computing module 302 sets the adjusted light intensity level Vc as the upper approach level Vm, and the flow may enter into block S610.

In block S610, the computing module 302 determines whether a difference between the upper approach level Vm and the lower approach level Vn is less than a predetermined value preset by the user. In the embodiment, the predetermined value equals 2.

If the difference is no less than the predetermined value, in block S612, the computing module 302 determines that the adjusted light intensity level Vc is the optimum light intensity level Vp.

Otherwise, if the difference is less than the predetermined value, the flow may return block S602 to compute the optimum light intensity level Vp according to the above method. For example, if the adjusted light intensity level Vc set in block S602 is equal to Vc1 and the gray value of the adjusted image is equal to Gc1, the computing module 302 uses the formula Vc=(Vm+Vn)/2 to compute an adjusted light intensity level Vc2, and obtains a corresponding gray value Gc2 of the adjusted image, then the computing module 302 repeats the blocks from block S604 to block S610 till the optimum light intensity level Vp is computed.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for adjusting light intensity of light sources of an image measuring machine, the method comprising steps of:
    obtaining a surface image of an object that is positioned on the image measuring machine;
    setting one light source to be adjusted, and adjusting a light intensity of the light source according to an adjusting mode;
    computing an optimum light intensity level of the light source by steps (a) to (g) upon the condition that the adjusting mode is set as a definition mode for adjusting a definition of the surface image:
    (a) setting the light source to an original light intensity level to obtain a first surface image and computing a first average definition corresponding to the first surface image, wherein the light source comprises 101 intensity levels ranging from level 0-level 100 to reflect the light intensity, and wherein the original light intensity level is in the range from level 0-level 100;
    (b) increasing the original light intensity level to a second intensity level by adding ten levels to the original light intensity level, obtaining a second surface image and computing a second average definition of the second surface image;
    (c) determining whether the second average definition is greater than the first average definition if the second intensity level is not greater than 100;
    (d) in response to the second average definition being greater than the first average definition, returning to step (b), or decreasing the original light intensity level to a third intensity level by subtracting five levels from the original light intensity level, and computing a third average definition corresponding to the third intensity level, if the second average definition is not greater than the first average definition or if the second intensity level is greater than 100;
    (e) increasing the third intensity level to a forth intensity level by adding two levels to the third intensity level, and computing a forth average definition corresponding to the forth intensity level;
    (f) determining whether the forth average definition is greater than the third average definition; and
    (g) in response to the forth average definition being greater than the third average definition, returning to step (e), or determining that the forth intensity level is the optimum light intensity level, if the forth average definition is not greater than the third average definition and the forth intensity level is not equal to 100;
    obtaining an optimum surface image of the object by adjusting a light intensity level of the light source to the optimum light intensity level; and
    storing the optimum surface image and the optimum light intensity level into a storage system.

2. The method according to claim 1, wherein the adjusting mode further comprises a gray mode for adjusting a gray value of the surface image.

3. The method according to claim 2, wherein in response to the adjusting mode being set as the gray mode, the step of computing an optimum light intensity level of the light source comprises steps of:
    (i) setting the light source to an original light intensity level, wherein the light source comprises 101 intensity levels ranging from level 0-level 100 to reflect the light intensity, and wherein the original light intensity level is in the range from 0-100;
    (ii) obtaining the surface image of the object, and performing a mean filter processing and a binary image processing on the surface image;
    (iii) setting intensity variables to adjust the light intensity of the light source, the intensity variables comprising an upper approach level and a lower approach level;
    (iv) initializing the intensity variables to set the upper approach level to 100 and set the lower approach level to 2;

(v) adjusting the light intensity of the light source to an adjusted light intensity level, wherein the adjusted light intensity level is equal to one half of a sum value of the upper approach level and the lower approach level;

(vi) obtaining an adjusted image of the object based on the adjusted light intensity level, and computing a gray value of the adjusted image;

(vii) determining whether the gray value of the adjusted image is less than an optimum gray value, wherein the optimum gray value is a gray value of the optimum surface image that is a middle value in the range from 0-255; and (viii) determining that the optimum light intensity level is equal to the adjusted light intensity level if the gray value of the adjusted image is equal to the optimum gray value.

4. The method according to claim 3, further comprising:

setting the adjusted light intensity level as the lower approach level if the gray value of the adjusted image is less than the optimum gray value, or setting the adjusted light intensity level as the upper approach level if the gray value of the adjusted image is greater than the optimum gray value;

determining whether a difference between the upper approach level and the lower approach level is less than a predetermined value; and returning to step (v) if the difference is no less than the predetermined value, or determining that the optimum light intensity level is equal to the adjusted light intensity level if the difference is less than the predetermined value.

5. The method according to claim 4, wherein the predetermined value equals 2.

6. The method according to claim 1, wherein the light source is one of an axis light and a ring light.

7. A computing system for adjusting light intensity of light sources of an image measuring machine, the computing system comprising:

a setting module operable to set one light source to be adjusted after a surface image of an object on the image measuring machine is obtained;

a computing module operable to compute an optimum light intensity level of the light source by steps (a) to (g) upon the condition that the adjusting mode is set as a definition mode for adjusting a definition of the surface image:

(a) setting the light source to an original light intensity level to obtain a first surface image and computing a first average definition corresponding to the first surface image, wherein the light source comprises 101 intensity levels ranging from level 0-level 100 to reflect the light intensity, and wherein the original light intensity level is in the range from level 0-level 100;

(b) increasing the original light intensity level to a second intensity level by adding ten levels to the original light intensity level, obtaining a second surface image and computing a second average definition of the second surface image;

(c) determining whether the second average definition is greater than the first average definition if the second intensity level is not greater than 100;

(d) in response to the second average definition being greater than the first average definition, returning to step (b), or decreasing the original light intensity level to a third intensity level by subtracting five levels from the original light intensity level, and computing a third average definition corresponding to the third intensity level, if the second average definition is not greater than the first average definition or if the second intensity level is greater than 100;

(e) increasing the third intensity level to a forth intensity level by adding two levels to the third intensity level, and computing a forth average definition corresponding to the forth intensity level;

(f) determining whether the forth average definition is greater than the third average definition; and (g) in response to the forth average definition being greater than the third average definition, returning to step (e), or determining that the forth intensity level is the optimum light intensity level, if the forth average definition is not greater than the third average definition and the forth intensity level is not equal to 100;

an adjusting module operable to obtain an optimum surface image of the object by adjusting a light intensity level of the light source to the optimum light intensity level;

a outputting module operable to display the optimum surface image on a display device, and store the optimum surface image and the optimum light intensity level into a storage system; and at least one processor that executes the setting module, the computing module, the adjusting module, and the outputting module.

8. The computing system according to claim 7, wherein the light source is one of an axis light and a ring light.

9. The computing system according to claim 7, wherein the adjusting mode further comprises a gray mode for adjusting a gray value of the surface image.

10. The computing system according to claim 9, wherein in response to the adjusting mode being set as the gray mode, the computing module is further operable to set intensity variables for adjusting the light source, and compute an optimum light intensity level of the light source utilizing an iterative method according to the intensity variables.

11. The computing system according to claim 10, further comprising an image processing module operable to perform a mean filter processing and a binary image processing on the surface image of the object.

12. The computing system according to claim 7, wherein the storage system is at least one of a hard disk drive, a compact disc, a digital video disc, and a tape drive.

13. A non-transitory storage medium having stored thereon instructions that, when executed by a processor, causing the processor to perform a method for adjusting light intensity of light sources of an image measurement machine, wherein the method comprises steps of:

obtaining a surface image of an object that is positioned on the image measuring machine;

setting one light source to be adjusted, and adjusting a light intensity of the light source according to an adjusting mode;

computing an optimum light intensity level of the light source by steps (a) to (g) upon the condition that the adjusting mode is set as a definition mode for adjusting a definition of the surface image:

(a) setting the light source to an original light intensity level to obtain a first surface image and computing a first average definition corresponding to the first surface image, wherein the light source comprises 101 intensity levels ranging from level 0-level 100 to reflect the light intensity, and wherein the original light intensity level is in the range from level 0-level 100;

(b) increasing the original light intensity level to a second intensity level by adding ten levels to the original light intensity level, obtaining a second surface image and computing a second average definition of the second surface image;

(c) determining whether the second average definition is greater than the first average definition if the second intensity level is not greater than 100;

(d) in response to the second average definition being greater than the first average definition, returning to step (b), or decreasing the original light intensity level to a third intensity level by subtracting five levels from the original light intensity level, and computing a third average definition corresponding to the third intensity level, if the second average definition is not greater than the first average definition or if the second intensity level is greater than 100;

(e) increasing the third intensity level to a forth intensity level by adding two levels to the third intensity level, and computing a forth average definition corresponding to the forth intensity level;

(f) determining whether the forth average definition is greater than the third average definition; and (g) in response to the forth average definition being greater than the third average definition, returning to step (e), or determining that the forth intensity level is the optimum light intensity level, if the forth average definition is not greater than the third average definition and the forth intensity level is not equal to 100;

obtaining an optimum surface image of the object by adjusting the intensity of the light source to the optimum light intensity level; and storing the optimum surface image and the optimum light intensity level into a storage system.

14. The non-transitory storage medium according to claim 13, wherein the adjusting mode further comprises a gray mode for adjusting a gray value of the surface image.

15. The non-transitory storage medium according to claim 14, wherein in response to the adjusting mode being set as the mode of adjusting gray value of the surface image, the step of computing an optimum light intensity level of the light source comprises steps of:

(i) setting the light source to an original light intensity level, wherein the light source comprises 101 intensity levels ranging from level 0-level 100 to reflect the light intensity, and wherein the original light intensity level is in the range from 0-100;

(ii) obtaining the surface image of the object, and performing a mean filter processing and a binary image processing on the surface image;

(iii) setting intensity variables to adjust the light intensity of the light source, the intensity variables comprising an upper approach level and a lower approach level;

(iv) initializing the intensity variables to set the upper approach level to 100 and set the lower approach level to 2;

(v) adjusting the light intensity of the light source to an adjusted light intensity level, wherein the adjusted light intensity level is equal to one half of a sum value of the upper approach level and the lower approach level;

(vi) obtaining an adjusted image of the object based on the adjusted light intensity level, and computing a gray value of the adjusted image;

(vii) determining whether the gray value of the adjusted image is less than an optimum gray value, wherein the optimum gray value is a gray value of the optimum surface image that is a middle value in the range from 0-255; and (viii) determining that the optimum light intensity level is equal to the adjusted light intensity level if the gray value of the adjusted image is equal to the optimum gray value.

16. The non-transitory storage medium according to claim 15, wherein the method further comprises:

setting the adjusted light intensity level as the lower approach level if the gray value of the adjusted image is less than the optimum gray value, or setting the adjusted light intensity level as the upper approach level if the gray value of the adjusted image is greater than the optimum gray value;

determining whether a difference between the upper approach level and the lower approach level is less than a predetermined value, wherein the predetermined value equals 2; and returning to step (v) if the difference is no less than the predetermined value, or determining that the optimum light intensity level is equal to the adjusted light intensity level if the difference is less than the predetermined value.

17. The non-transitory storage medium according to claim 15, wherein the light source is one of an axis light and a ring light.

* * * * *